(12) United States Patent
Thomsen et al.

(10) Patent No.: US 11,962,686 B2
(45) Date of Patent: Apr. 16, 2024

(54) ENCRYPTING INTERMEDIATE DATA UNDER GROUP-LEVEL ENCRYPTION

(71) Applicant: SAP SE, Walldorf (DE)

(72) Inventors: Dirk Thomsen, Heidelberg (DE); Till Merker, Sandhausen (DE)

(73) Assignee: SAP SE, Walldorf (DE)

( * ) Notice: Subject to any disclaimer, the term of this patent is extended or adjusted under 35 U.S.C. 154(b) by 185 days.

(21) Appl. No.: 17/549,164

(22) Filed: Dec. 13, 2021

(65) Prior Publication Data

US 2023/0188328 A1 Jun. 15, 2023

(51) Int. Cl.
*H04L 9/08* (2006.01)
*G06F 21/62* (2013.01)
*H04L 9/06* (2006.01)

(52) U.S. Cl.
CPC ........ *H04L 9/0833* (2013.01); *G06F 21/6218* (2013.01); *H04L 9/0631* (2013.01); *H04L 9/0869* (2013.01)

(58) Field of Classification Search
CPC ... H04L 9/0833; H04L 9/0631; H04L 9/0869; H04L 9/0891; H04L 9/0894; H04L 9/08; G06F 21/6218; G06F 21/602; G06F 21/6227; G06F 2221/2107
See application file for complete search history.

(56) References Cited

U.S. PATENT DOCUMENTS 10,783,269 B1 * 9/2020 Shraer .................. H04L 9/3242
2021/0318987 A1 * 10/2021 Park ....................... G06F 3/0659

* cited by examiner

*Primary Examiner* — Quazi Farooqui
(74) *Attorney, Agent, or Firm* — Fountainhead Law Group P.C.

(57) ABSTRACT

Computer-readable media, methods, and systems are disclosed for handling intermediate data in connection with a database employing group-level encryption. Intermediate data is used during database operation and stored transiently such that the intermediate data is removed from memory upon database restart. To protect the privacy of the intermediate data, a random encryption key may be generated upon startup of a database instance. The random encryption key may be stored transiently. During database operation, the random encryption key may be used to encrypt and/or decrypt the intermediate data. The transient memory may be wiped upon database shut down such that the random encryption key is no longer accessible upon database restart.

20 Claims, 5 Drawing Sheets

ENCRYPTING INTERMEDIATE DATA UNDER GROUP-LEVEL ENCRYPTION

TECHNICAL FIELD

Embodiments generally relate to data encryption in a database management system, and more particularly to encrypting intermediate data not attributable to a single encryption group in connection with databases that employ group-level encryption to support multi-tenant data privacy.

Encryption of persisted in-memory database data is typically done at the level of a persisted data volume. Such data-volume-level encryption has the benefit of protecting the persisted data should physical access be improperly obtained to media containing the persisted database data. However, in the case of cloud-based, multi-tenant applications using an in-memory database, the data of multiple customers may be stored in a single in-memory database system. In such a case, the data for each customer in the multi-tenant application should be separately encrypted such that each individual customer has exclusive control over the customer's own encryption key(s), thereby ensuring group-level data privacy for the customer of a multi-tenant cloud-based application. Moreover, such group-level encryption and decryption processes should not require re-implementation of multi-tenant, cloud-based applications.

Some database data may belong to more than a single tenant. For example, data from intermediate results of a join operation that incorporate data from multiple tenants may be considered as belonging to multiple tenants. Handling such intermediate data presents difficulties because the customer's own encryption key nor a vendor-provided key should be used for encrypting the intermediate data.

Accordingly, what is needed is a method for efficiently and reliably handling intermediate data using group-level encryption in an in-memory database with persistency, without requiring application redesign, thereby addressing the above-mentioned problems.

SUMMARY

Disclosed embodiments address the above-mentioned problems by providing one or more non-transitory computer-readable media storing computer-executable instructions that, when executed by a processor, perform a method for handling intermediate data in connection with a database employing group-level encryption, the method comprising upon startup of an instance of the database, generating a random encryption key, storing the random encryption key in transient memory, receiving a set of intermediate data, the set of intermediate data comprising data associated with a plurality of encryption groups associated with the database, performing an encryption operation on the set of intermediate data using the random encryption key, receiving a request to shut down the database, and responsive to receiving the shut down request, wiping the transient memory. An encryption group of the plurality of encryption group may comprise a unique encryption key for encrypting data.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present teachings will be apparent from the following detailed description of the embodiments and the accompanying drawing figures.

BRIEF DESCRIPTION OF THE DRAWING FIGURES

Embodiments are described in detail below with reference to the attached drawing figures, wherein.

Figure 1:
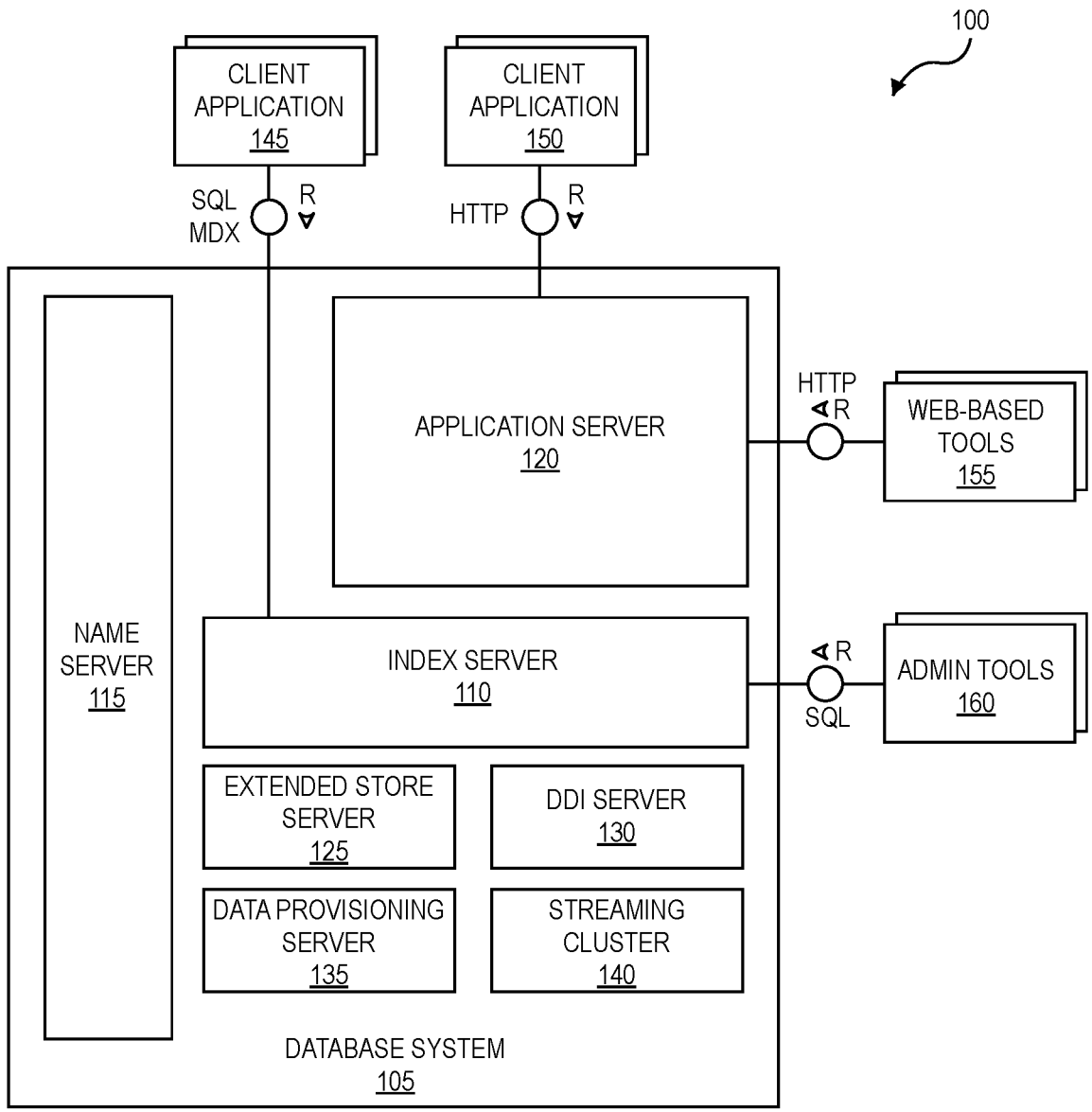
FIG. 1 is a system diagram illustrating an example database system for use in connection with the current subject matter.

The drawing figures do not limit the present teachings to the specific embodiments disclosed and described herein. The drawings are not necessarily to scale, emphasis instead being placed upon clearly illustrating the principles of the disclosure.

DETAILED DESCRIPTION

In some cases, cloud-based, multi-tenant applications need to provide data privacy on a tenant-by tenant basis, and in some cases a particular tenant has the requirement to be responsible for the tenant's own encryption keys so that even an operator of a cloud-based application or a data center in which the application is being hosted will not have access to the tenant's data. In some embodiments, to encrypt data on a tenant-by-tenant basis, encryption groups are employed. In some embodiments, each tenant is associated with its own encryption group. In some alternative embodiments, tenants share encryption groups. A data container is a logical unit of persistence which may be encrypted at a group-level. In some embodiments, each data container is assigned to a particular encryption group. Data within one encryption group is encrypted and decrypted with the same group-level encryption key. The group-level encryption key for a particular encryption group may be unique to that encryption group. In some embodiments, metadata associated with each container includes an encryption group identifier corresponding to which encryption group with which the container is associated. In these embodiments, this is the container directory entry.

A converter is a data structure that maintains a mapping from logical page numbers to corresponding physical block numbers within one or more data volumes. In some embodiments, converter metadata associated with a converter stores a value corresponding to the encryption group that each data page belongs to within a converter entry in the converter metadata. The converter entry provides a mapping from logical page number to physical block number. In some embodiments, a database operation may require that a data container read in one or more data pages associated with the data container. In these embodiments, the data container provides a source of information regarding an association between an encryption group identifier and a page access function. In some embodiments, the corresponding encryption group identifier is used to decrypt the loaded group-level encrypted page content. The encryption group identifier is also stored within a transient page control block to be used for encrypting page content while flushing a page at such time as the page needs to be persisted after having been modified by a database operation. A transient page control block is an object that stores additional information for the page which is only needed for a limited amount of time. In some embodiments, a transient control page is a control block which is stored within a resource container and which holds a pointer to the actual in-memory representation of the page.

In some embodiments, only data page content is encrypted and/or decrypted with a corresponding group-level encryption key. By contrast, in these embodiments, the page header is not encrypted with the group-level encryption key. In some embodiments, the page header is encrypted with a data volume encryption key. In some alternative embodiments, the page header is unencrypted. The page header is not encrypted with the group-level encryption key so that that the information from the page header can be read for database internal operations such as backup and recovery and data volume resizing, where pages need to be accessed by the database system, but the corresponding user (tenant) content needs to remain encrypted with the group-level encryption key(s).

In some embodiments, cloud-based, multi-tenant applications comprise data that is not just owned by a single tenant. Such data, hereinafter referred to as intermediate data, may be handled differently than data that can be associated with a single tenant. For example, intermediate data may comprise data resulting from a join operation between multiple tenants associated with multiple encryption groups. To protect the privacy of such intermediate data, neither a cloud operator encryption key nor a single tenant's encryption key should be used to encrypt the data. Such intermediate data may be stored in a data volume. Advantageously, the intermediate data may be wiped upon system restart and is only required to be accessible during operation of the multi-tenant applications. As discussed in further detail below with respect to FIGS. 4A-4C, the intermediate data may be stored in temporary page access. Data stored in this temporary page access is implicitly deleted upon restart and is unrecoverable after restart. This feature may be taken advantage of by using a temporary key, which may also be stored in temporary memory, that no longer exists and is unrecoverable after restart.

To protect the privacy of intermediate data during operation, a random key may be generated. The random key may be generated during startup of a database instance. During operation, the random key may be rotated. In some embodiments, the random key is stored only in transient memory. The random key may then be used for encryption/decryption of data pages which cannot be assigned to a single encryption group. Once the system is restarted, the intermediate data may be wiped from memory.

The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

The following detailed description of embodiments references the accompanying drawings that illustrate specific embodiments in which the present teachings can be practiced. The described embodiments are intended to illustrate aspects of the present teachings in sufficient detail to enable those skilled in the art to practice the present teachings. Other embodiments can be utilized, and changes can be made without departing from the claims. The following detailed description is, therefore, not to be taken in a limiting sense. The scope of embodiments is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Operational Environment for Embodiments

Turning first to FIG. 1, which depicts a diagram 100 illustrating a database system 105 that can be used to implement aspects of the present teachings. Database system 105 can, for example, be an in-memory database in which all relevant data is kept in main memory so that read operations can be executed without disk I/O and in which disk storage is required to make any changes durable by way of persistent storage. Database system 105 can include a plurality of servers including, for example, one or more of index server 110, name server 115, and/or application server 120. Database system 105 can also include one or more of extended store server 125, database deployment infrastructure (DDI) server 130, data provisioning server 135, and/or streaming cluster 140. Database system 105 can be accessed by a plurality of client applications 145, 150 via different protocols such as structured query language (SQL) and/or multidimensional expressions (MDX), by way of index server 110, and/or web-based protocols such as hyper-text transport protocol (HTTP), by way of application server 120.

Index server 110 may contain in-memory data stores and engines for processing data. Index server 110 may also be accessed by remote tools (via, for example, SQL queries), that can provide various development environment and administration tools. Additional details regarding an example implementation of index server 110 is described and illustrated in connection with diagram 200 of FIG. 2 below.

In some embodiments, name server 115 is responsible for information about various topologies associated with database system 105. In various exemplary distributed database systems, name server 115 provides descriptions regarding where various components are running and which data is located on which server. In connection with database system 105 having multiple database containers, name server 115 may provide information regarding existing database containers. Name server 115 may also host one or more system databases. For example, name server 115 may manage the information regarding existing tenant databases, which tenant databases are isolated from one another. Unlike name server 115 in a single-container database system, name server 115 in a database system 105 having multiple database containers does not store topology information such as the location of tables in a distributed database. In a multi-container database system 105 such database-level topology information can be stored as part of data catalogs associated with the various isolated tenant databases.

Application server 120 can enable native web applications used by one or more client applications 150 accessing database system 105 via a web protocol such as HTTP. In various embodiments, application server 120 allows developers to write and run various database applications without the need to provide an additional application server. In some embodiments, application server 120 can also be used to run web-based tools 155 for administration, life-cycle management, and application development. Other administration and development tools 160 can directly access index server 110 for, example, via SQL and/or other protocols.

In various embodiments, extended store server 125 can be part of a dynamic tiering option that can include a high-performance disk-based column store for very big data up to the petabyte range and beyond. Less frequently accessed data (for which is it non-optimal to maintain in main memory of the index server 110) can be maintained in connection with extended store server 125. Dynamic tiering associated with extended store server 125 allows for hosting of very large databases with a reduced cost of ownership as compared to conventional arrangements.

In various embodiments, DDI server 130 may be a separate server process that is part of a database deployment infrastructure. This infrastructure may be a layer of database system 105 that simplifies deployment of database objects using declarative design time artifacts. DDI can ensure a consistent deployment, for example by guaranteeing that multiple objects are deployed in the right sequence based on dependencies, and by implementing a transactional all-or-nothing deployment.

In some embodiments, data provisioning server 135 provides enterprise information management and enables capabilities such as data provisioning in real time and batch mode, real-time data transformations, data quality functions, adapters for various types of remote sources, and an adapter software design kit (SDK) for developing additional adapters. In various embodiments, streaming cluster 140 allows for various types of data streams (i.e., data feeds, etc.) to be utilized by database system 105. Streaming cluster 140 allows for both consumption of data streams and for complex event processing.

Figure 2:
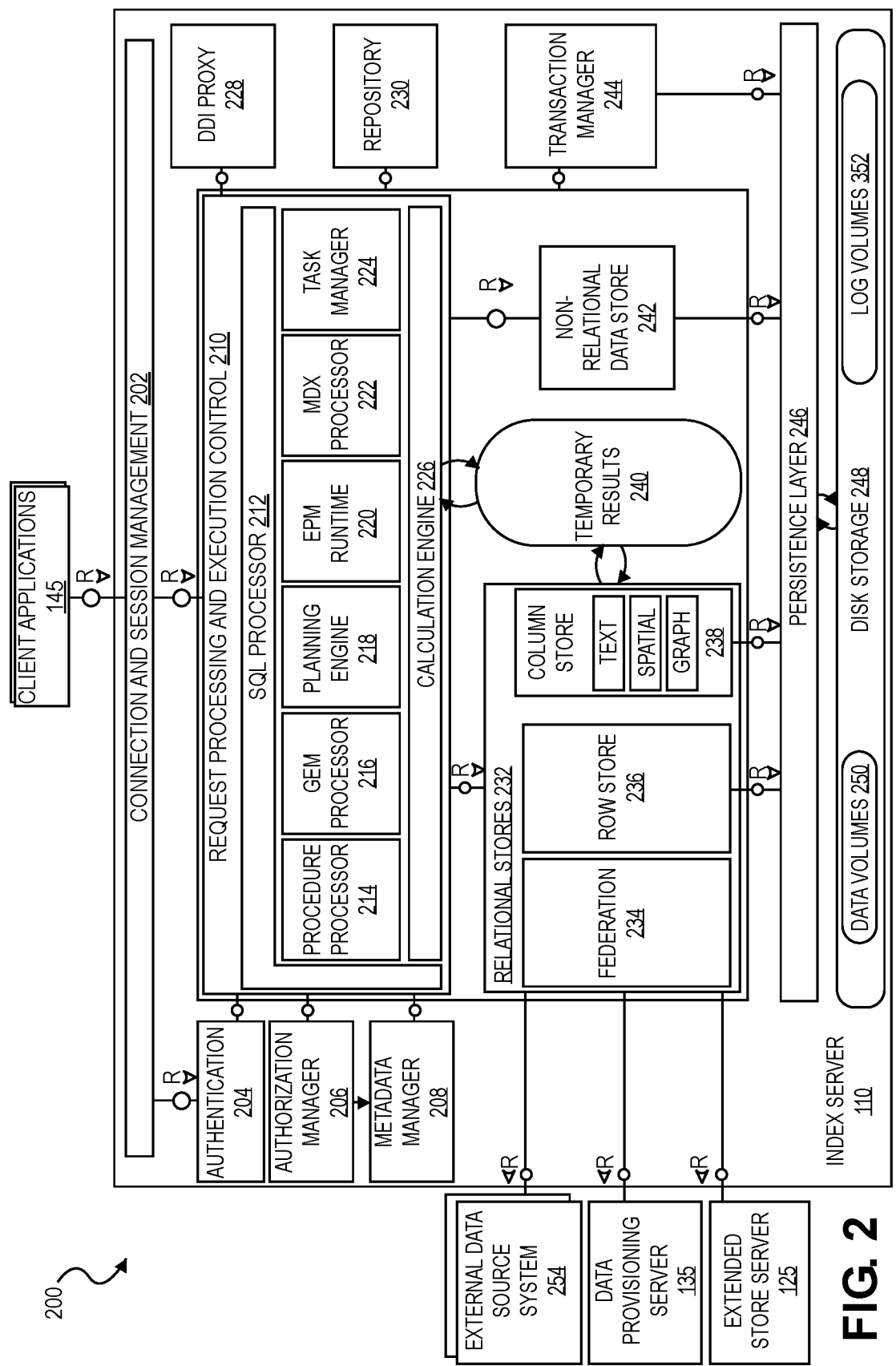
FIG. 2 is a diagram illustrating an architecture for an index server for use in connection with the current subject matter.

Turning now to FIG. 2, in which a diagram 200 illustrating an architecture for index server 110 is depicted. A connection and session management component 202 can create and manage sessions and connections for the client applications 145. For each session, a set of parameters can be maintained such as, for example, auto commit settings or the current transaction isolation level. Requests from the client applications 145 can be processed and executed by way of a request processing and execution control component 210. In various embodiments, database system 105 of FIG. 1 offers rich programming capabilities for running application-specific calculations inside the database system. In addition to SQL, MDX, and WIPE, database system 105 provides various programming languages for different use cases. SQLScript can be used to write database procedures and user defined functions that can be used in SQL statements. The L language is an imperative language, which can be used to implement operator logic that can be called by SQLScript procedures and for writing user-defined functions.

Once a session is established, client applications 145 typically use SQL statements to communicate with the index server 110 which can be handled by SQL processor 212 within the request processing and execution control component 210. Analytical applications may employ MDX language expressions, which may be evaluated in connection with MDX processor 222. For graph data, applications may employ GEM (Graph Query and Manipulation) via GEM processor 216, a graph query and manipulation language. In various embodiments, SQL statements and MDX queries may be sent over the same connection with the client application 145 using the same or similar network communication protocols. In some embodiments, GEM statements may be sent using a built-in SQL system procedure.

In various embodiments, index server 110 includes an authentication component 204 that can be invoked with a new connection with a client application 145 is established. Users can be authenticated either by the database system 105 itself (login with user and password) or authentication can be delegated to an external authentication provider. In some embodiments, authorization manager 206 can be invoked by other components of database system 105 to check whether a particular user has the required privileges to execute a requested operation. In various embodiments, requested operations in the form of statements or queries may be processed in the context of a transaction having a beginning and end so that any such transaction may be committed or rolled back. New sessions may be implicitly assigned to a new transaction. In various embodiments, index server 110 includes transaction manager 244 that coordinates transactions, controls transactional isolation, and keeps track of running and closed transactions. When a transaction is committed or rolled back, the transaction manager 244 can inform the involved engines about this event so they can execute necessary actions. Transaction manager 244 can provide various types of concurrency control and transaction manager 244 can cooperate with a persistence layer 246 to persist atomic and durable transactions.

In various embodiments, incoming SQL requests from client applications 145 are received by SQL processor 212. In some embodiments, data manipulation statements are executed by SQL processor 212 itself. In these embodiments, other types of requests are delegated to respective components for processing a corresponding type of request. Data definition statements can be dispatched to metadata manager 208, transaction control statements can be forwarded to transaction manager 244, planning commands can be routed to a planning engine 218, and task related commands can be forwarded to a task manager 224 (which can be part of a larger task framework) Incoming MDX requests can be delegated to the MDX processor 222. Procedure calls can be forwarded to the procedure processor 214, which further dispatches various calls, for example to a calculation engine 226, GEM processor 216, repository 230, or DDI proxy 228.

In various embodiments, index server 110 also includes planning engine 218 that enables implementation of planning applications, for instance for financial planning, to execute basic planning operations in the database layer. One such basic operation is to create a new version of a data set as a copy of an existing one while applying filters and transformations. For example, planning data for a new year can be created as a copy of the data from the previous year. Another example for a planning operation is the disaggregation operation that distributes target values from higher to lower aggregation levels based on a distribution function.

In various embodiments, SQL processor 212 includes an enterprise performance management (EPM) runtime component 220 that can form part of a larger platform providing an infrastructure for developing and running enterprise performance management applications in connection with database system 105. While planning engine 218 typically provides basic planning operations, in some embodiments, exemplary EPM platforms provide a foundation for complete planning applications, based on by application-specific planning models managed in connection with database system 105.

In various embodiments, calculation engine 226 provides a common infrastructure that implements various features such as SQL processing, SQLScript interpretation, evaluation of MDX and/or GEM, tasks, and execution of planning operations. In various embodiments SQL processor 212, MDX processor 222, planning engine 218, task manager 224, and GEM processor 216 can translate various corresponding programming languages, query languages, and models into a common representation that is optimized and executed by calculation engine 226. In various embodiments, calculation engine 226 implements those features using temporary results 240 which can be based, in part, on data within the relational stores 232.

Metadata can be accessed via metadata manager 208. Metadata, in this context, can comprise a variety of objects, such as definitions of relational tables, columns, views, indexes and procedures. In some embodiments, metadata of all such types can be stored in one common database catalog for all stores. In these embodiments, the database catalog can be stored in tables in row store 236 forming part of a group of relational stores 232. Other aspects of database system 105 including, for example, support and multi-version concurrency control can also be used for metadata management. In distributed systems, central metadata is shared across servers and metadata manager 208 can coordinate or otherwise manage such sharing.

In various embodiments, relational stores 232 provide a foundation for different data management components of index server 110. In these embodiments, relational stores can, for example, store data in main memory. In these embodiments, row store 236, column store 238, and federation component 234 are all relational data stores which can provide access to data organized in relational tables. Column store 238 can stores relational tables column-wise (i.e., in a column-oriented fashion, etc.). Column store 238 can also comprise text search and analysis capabilities, support for spatial data, and operators and storage for graph-structured data. With regard to graph-structured data, from an application viewpoint, column store 238 could be viewed as a non-relational and schema-flexible, in-memory data store for graph-structured data. However, in various embodiments, such a graph store is not technically implemented as a separate physical data store. Instead, the graph store is built using column store 238, which may be provided in connection with a dedicated graph API.

In various embodiments, row store 236 stores relational tables row-wise. When a table is created, a creator specifies whether the table is to be row- or column-based. In various embodiments, tables can be migrated between the two storage formats of row- and column-based. While certain SQL extensions may be only available for one kind of table (such as the "merge" command for column tables), standard SQL may be used in connection with both types of tables. In various embodiments, index server 110 also provides functionality to combine both kinds of tables in one statement (join, sub query, union).

Federation component 234 can be viewed as a virtual relational data store. The federation component 234 can provide access to remote data in external data source system(s) 254 through virtual tables, which can be used in SQL queries in a fashion similar to normal tables. Database system 105 can include an integration of non-relational data store 242 into the index server 110. For example, the non-relational data store 242 can have data represented as networks of C++ objects, which can be persisted to disk or other persistent storage. Non-relational data store 242 can be used, for example, for optimization and planning tasks that operate on large networks of data objects, for example in supply chain management. Unlike row store 236 and column store 238, non-relational data store 242 does not use relational tables; rather, objects can be directly stored in containers provided by persistence layer 246. Fixed size entry containers can be used to store objects of one class. Persisted objects can be loaded via their persisted object identifiers, which can also be used to persist references between objects. In addition, access via in-memory indexes is supported. In that case, the objects need to contain search keys. In various embodiments, an in-memory search index is created on first access. Non-relational data store 242 can be integrated with the transaction manager 244 to extends transaction management with sub-transactions, and to also provide an alternative locking protocol and implementation of multi-version concurrency control.

An extended store is another relational store that can be used or otherwise form part of database system 105. In some embodiments, the extended store can, for example, be a disk-based column store optimized for managing very big tables, which tables are not meant to be kept in memory (as with relational stores 232). In various embodiments, the extended store can run in extended store server 125 separate from index server 110. Index server 110 can use the federation component 234 to send SQL statements to extended store server 125.

Persistence layer 246 is responsible for durability and atomicity of transactions. Persistence layer 246 can ensure that database system 105 is restored to a most recent committed state after a restart and that transactions are either completely executed or completely undone. To achieve this goal in an efficient way, persistence layer 246 can use a combination of write-ahead logs, undo and cleanup logs, shadow paging and save points. Persistence layer 246 can provide interfaces for writing and reading persisted data and it can also contain a logger component that manages a recovery log. Recovery log entries can be written in the persistence layer 246 (in recovery log volumes 252) explicitly by using a log interface or implicitly when using the virtual file abstraction. Recovery log volumes 252 can include redo logs which specify database operations to be replayed whereas data volume 250 contains undo logs which specify database operations to be undone as well as cleanup logs of committed operations which can be executed by a garbage collection process to reorganize the data area (e.g., free up space occupied by deleted data etc.).

Persistence layer 246 stores data in persistent disk storage 248 which, in turn, can include data volumes 250 and/or recovery log volumes 252 that can be organized in pages. Different page sizes can be supported, for example, between 4 KB and 16 MB. In addition, superblocks can also be supported which can have a larger size such as 64 MB and which can encapsulate numerous pages of different sizes. In various embodiments, database data is loaded from disk storage 248 and stored to disk page-wise. For read and write access, pages may be loaded into a page buffer in memory. Such a page buffer need not have a minimum or maximum size, rather, all free memory not used for other things can be used a page-buffer cache. If the memory is needed elsewhere, least recently used pages can be removed from the page-buffer cache. If a modified page is chosen to be removed, the page first needs to be persisted to disk storage 248. While the pages and the page-buffer cache are managed by persistence layer 246, the in-memory stores (i.e., the relational stores 232) can access data directly, within loaded pages.

As noted above, the data volumes 250 can include a data store that together with undo and cleanup log and recovery log volumes 252 comprise the recovery log. Other types of storage arrangements can be utilized depending on the desired configuration. The data store can comprise a snapshot of the corresponding database contents as of the last system save point. Such a snapshot provides a read-only static view of the database as it existed as of the point (i.e., time, etc.) at which the snapshot was created. Uncommitted transactions, at such time, are not reflected in the snapshot and are rolled back (i.e., are undone, etc.). In various embodiments, database snapshots operate at the data-page level such that all pages being modified are copied from the source data volume to the snapshot prior to their being modified via a copy-on-write operation. The snapshot can store such original pages thereby preserving the data records as they existed when the snapshot was created.

System save points (also known in the field of relational database servers as checkpoints) can be periodically or manually generated and provide a point at which the recovery log can be truncated. The save point can, in some variations, include an undo log of transactions which were open in the save point and/or a cleanup log of transactions which were committed in the save point but not yet garbage collected (i.e., data which has been deleted by these transactions has been marked as deleted but has not been deleted in a physical manner to assure multi-version concurrency control).

In some embodiments, a recovery log comprises a log of all changes to database system 105 since the last system save point, such that when a database server is restarted, its latest state is restored by replaying the changes from the recovery log on top of the last system save point. Typically, in a relational database system, the previous recovery log is cleared whenever a system save point occurs, which then starts a new, empty recovery log that will be effective until the next system save point. While the recovery log is processed, a new cleanup log is generated which needs to be processed as soon as the commit is replayed to avoid a growing data area because of deleted but not garbage collected data. In some embodiments, shadow pages that are designated to be freed are freed in connection with such a cleanup log. In some embodiments, a garbage collection process executes periodically to free data pages that are designated to be freed.

As part of a database system recovery/restart, after the save pointed state of data is restored, and before processing of the recovery log commences, all cleanup logs can be iterated through and, in implementations using a history manager, passed to the history manager for asynchronous garbage collection processing. In addition, it can be checked if there are older versions of the cleanup log present in the save point which need to be processed synchronously with regard to the recovery log. In such cases, recovery log processing can wait until garbage collection of old versions of cleanup logs finish. However, recovery log processing can commence when there are newer versions of cleanup logs for garbage collection. In cases in which no old versions of cleanup logs exist, recovery log replay can start immediately after the cleanup log from the save point has been passed to the history manager.

A typical save point can have three phases. First, in the pre-critical phase all modified pages in the relational stores 232 (which are loaded into memory) can be iterated through and flushed to the physical persistence disk storage 248. Second, a critical phase can block all parallel updates to pages in the relational stores 232 and trigger all the remaining I/O (i.e., I/O for pages still being modified when entering the critical phase) for the physical persistence disk storage 248 to ensure the consistent state of data. Lastly, a post-critical phase can wait for all remaining I/O associated with the physical persistence disk storage 248.

In various embodiments, database system 105 can be recovered after a failure or other error using information within the recovery log volumes 252 and the data volumes 250. As part of a recovery operation, pages from the backup storage 248 are streamed into the page-buffer cache in the main memory of database system 105. These pages can have different sizes from 4 KB to 16 MB, etc. For smaller page sizes, the write I/O can be slow (i.e., processing numerous small pages can create a bottleneck for a resource flushing thread, etc.). To overcome this restriction, in some variations, multiple pages can be filled in-memory into a superblock (which is a page of a different, larger size such as 64 MB), then the complete superblock can be written to disk 248.

In order to address the issues with write I/O, pages are copied into a superblock. When the database system 105 utilizes encryption for security purposes, each page is encrypted when the page is put into the superblock by a recovery channel (which is a single thread). Given that this operation is single threaded, the page-by-page encryption can be a bottleneck which can cause database recovery to require hours and/or days to complete.

For normal pages (i.e., non-superblocks, etc.), instead of encrypting such pages in the recovery channel, the pages can be encrypted when being flushed to the disk storage 248. With superblocks, additional information is required to encrypt each page. Within a recovery channel, the small pages are copied into a superblock and a control block (i.e., the superblock control block) is generated for the superblock. The control block can be a transient object that includes for each page such as an encryption key and an initialization vector (i.e., a fixed-size input to a cryptographic primitive that can be random or pseudorandom, etc.). When the superblock is filled with small pages, a resource flush thread, using a plurality of helper threads (e.g., 64 helper threads, etc.), encrypts the pages in the superblock in parallel using the information within the control block and causes the superblock to be flushed to disk storage 248.

Figure 3:
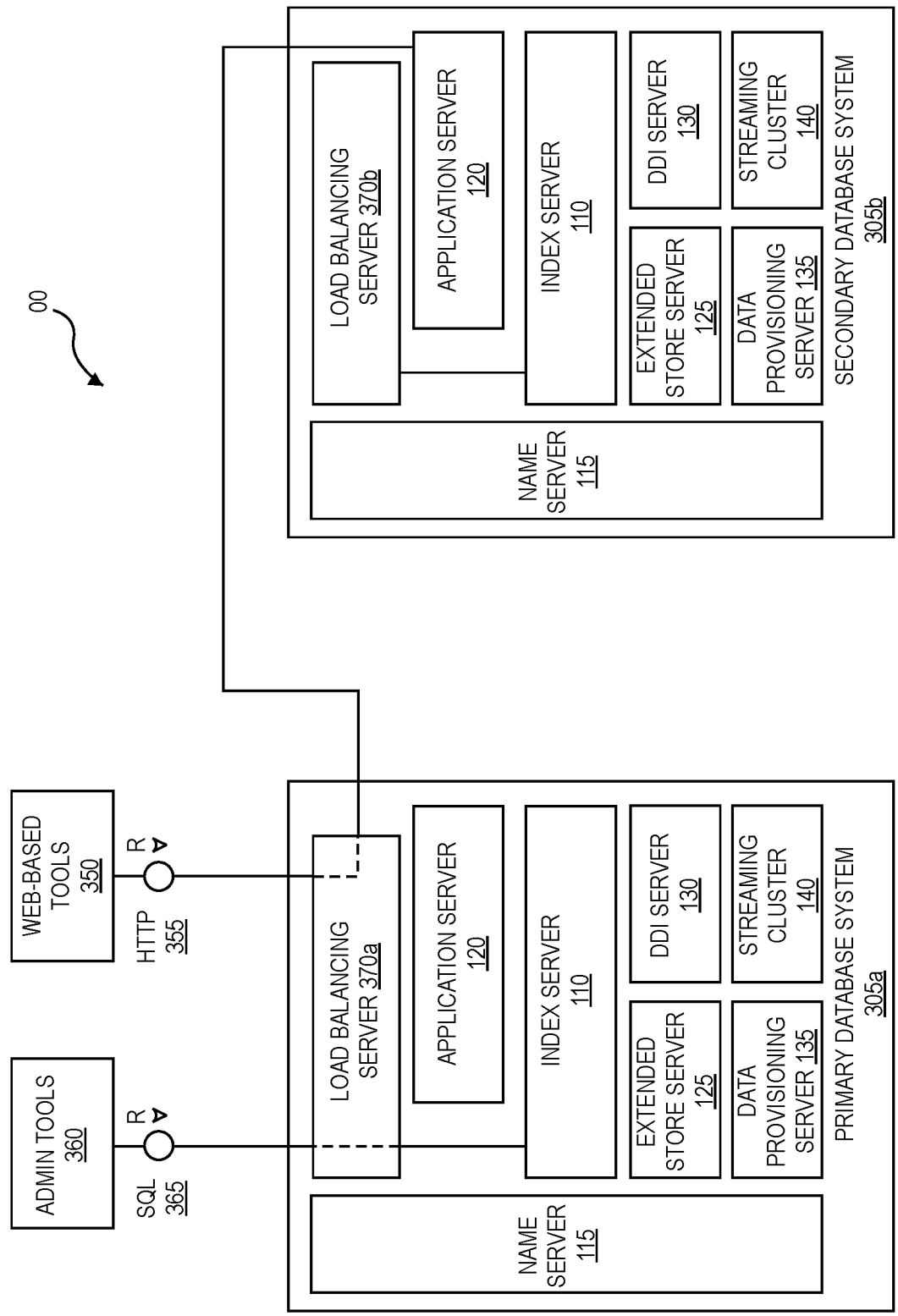
FIG. 3 is a functional flow diagram illustrating an architecture to support load balancing between a primary database system and a secondary database system.

Turning now to FIG. 3, in which a functional flow diagram is depicted, illustrating an architecture 300 to support load balancing between a primary database system 305a and a secondary database system 305b consistent with the present teachings. Each of the primary system 305a and the secondary system 305b may be a single instance system, similar to database system 105 depicted in FIG. 1, or each may be a distributed variation of database system 105. Such an architecture 300 may be useful in a high availability data system, or in a disaster recovery system, or in a combination high availability disaster recovery system.

Each of the primary system 305*a* and secondary system 305*b* may include a load balancing functionality. Such load balancing functionality may for example be contained within a distinct load balancing server 370*a* or 370*b*. But such load balancing functionality may be managed by any suitable processing system. For example, application server 120 of FIG. 1 may also manage the load balancing of requests issued to the application server of the primary system 305*a*, sending requests to the secondary system 305*b* as necessary to maintain a well-distributed workload.

As depicted in FIG. 3, each of the primary system 305*a* and the secondary system 305*b* includes load balancing server 370*a* and 370*b* which respectively receive requests from user applications directed to the primary system 305*a* or the secondary system 305*b*. Such request may come from either admin tools 360 or web-based tools 350, or any other user application. Upon receiving a request, a load balancing server, e.g., load balancing server 370*a*, determines how to distribute associated workload. As depicted, load balancing server 370*a* routes an SQL request 365 from admin tools 360 to index server 110 of primary system 305*a*, while routing an HTTP request 355 from web-based tools 350 to application server 120 of secondary system 305*b*.

Load balancing of resources between primary system 305*a* and secondary system 305*b* may give rise to several complicating issues. For example, if either of requests 355, 365 requires writing to one or more data tables, or modifying a data table, then the two systems 305*a*, 305*b* may diverge. After many instances of write requests being distributed between primary system 305*a* and secondary system 305*b*, the two systems would be substantially inconsistent, and likely unsuitable as replacements for each other. In another example, an application request, e.g., 365, may perform a write transaction that is followed by a read transaction, e.g., 355, related to the data written by the write request 365. If the write request is allocated to the primary system 305*a*, the read request would obtain a different result depending on whether the subsequent read transaction is carried out by the primary system 305*a* or by the secondary system 305*b*.

Load balancing in a combination high availability disaster recovery system, by distributing a portion of the workload of a primary data system to a hot-standby or backup system should be carried out in a manner that would not disturb the principal purpose of the backup system, which is to substantially eliminate downtime in a high availability system by enabling quick and efficient recovery of operations. In other words, as a rule load balancing cannot break the hot-standby. Given this principal purpose, any solution that enables load balancing of workload between a primary system and a backup system should maintain the backup system in an identical, or nearly identical, state as the primary system. Such a solution should also avoid or prohibit any actions which may cause the state of the backup system to substantially diverge from the state of the primary system. In this way, in the event of a partial or total failure of the primary system due to disaster, the backup system can failover to a primary system mode with minimal or no impact to client applications. In some embodiments, snapshots may be employed to facilitate database system replication.

Figure 4A:
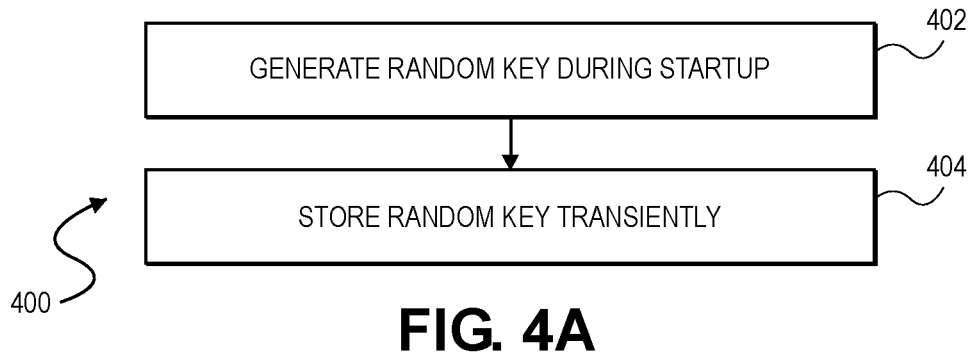
FIGS. 4A-4C are flow diagrams illustrating methods for handling intermediate data that belongs to more than one tenant in connection with databases that employ group-level encryption to support multi-tenant data privacy consistent with various embodiments.
Figure 4B:
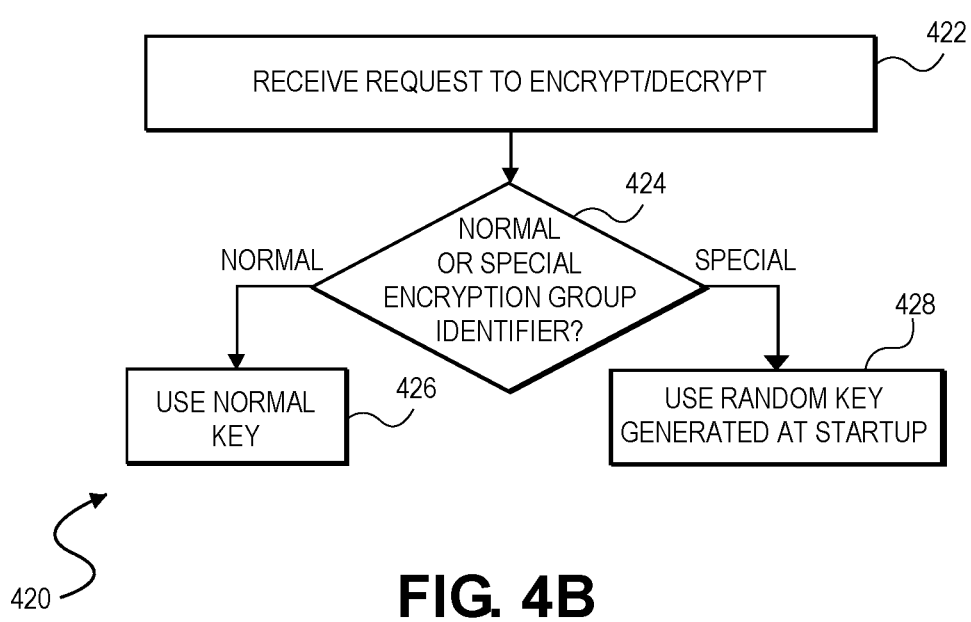
Figure 4C:
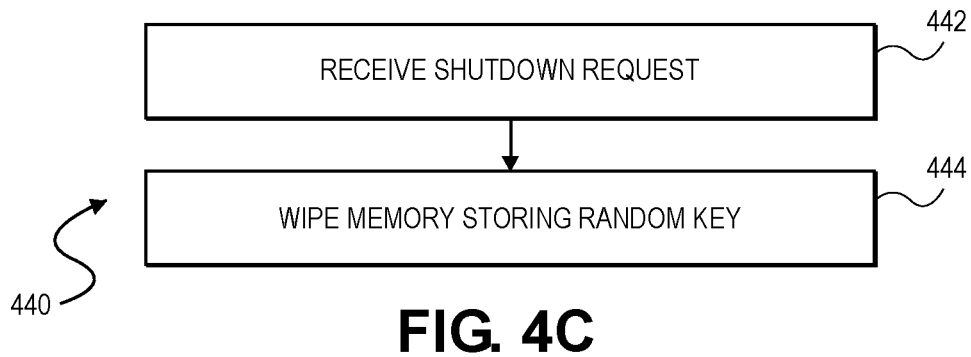

Turning now to FIGS. 4A-4C, which illustrate processes 400, 420, 440 in which exemplary methods are depicted for handling intermediate data in connection with a database that employs group-level encryption to support multi-tenant data privacy. As previously described, intermediate data may need to be handled differently than other data types in a multi-tenant system. Intermediate data may represent data that belongs to more than one encryption group. During database operation, the intermediate data may be stored in the data volume. By storing the intermediate data in the data volume, the intermediate data may be flushed to disk to prevent issues that may arise due to out-of-memory situations.

FIG. 4A illustrates process 400 for handling intermediate data upon database startup for some embodiments. At step 402, upon startup of a database instance, a random encryption key may be generated. The random encryption key may be generated using a random number generator or a pseudorandom number generator. The random encryption key may be for either a symmetric-key algorithm or an asymmetric-key algorithm. In some embodiments, the random encryption key is generated according to the Advanced Encryption Standard (AES) and may be generated at a bit size of 128, 192, or 256 bits. At step 404, the random encryption key may be stored transiently in memory. By storing the random encryption key transiently, the random encryption key may only be accessible for encryption/decryption operations.

FIG. 4B illustrates process 420 for handling intermediate data during online operations for some embodiments. Process 420 may occur subsequently to database startup as outlined in process 400. At step 422, a request may be received to perform encryption operations on data in the database. Next, at step 424, it may be determined whether the encryption group identifier for the encryption/decryption operation is a normal encryption group identifier or the special encryption group identifier. The normal encryption group identifier corresponding to the customer-controlled encryption group identifier that is unique to that specific customer, while the special encryption group identifier corresponds to an encryption group identifier for the random encryption key generated at step 402. If the encryption group identifier is the normal encryption group identifier, processing may proceed to step 426. If the encryption group identifier is the special encryption group identifier, processing may proceed to step 428.

At step 426, where the encryption group identifier is the normal encryption group identifier, the data may be encrypted/decrypted as it would be normally using the customer-controlled encryption group identifier. At step 428, where the encryption group identifier is the special encryption group identifier, the random encryption key may be used for encryption/decryption operations. In some embodiments, the random encryption key may be rotated during operation. Key rotation may be done on a periodic or user-defined basis.

FIG. 4C illustrates process 440 for handling intermediate data during database shutdown for some embodiments. Process 440 may occur subsequently to online operations of the database as outlined in FIG. 4B. At step 442, a request to shutdown the database may be received. In some embodiments, the shutdown is initiated by a user. In some embodiments, the shutdown is due to a crash. Thereafter, at step 444, the transient memory storing the random key may be wiped such that they key no longer exists after database shutdown. Wiping of the memory may be done using various techniques such as, but not limited to, zero-fill, Gutman, Secure Erase method, Extended Secure Erase method, or the like. As previously described, by using a purely transient random encryption key, the intermediate data, which is implicitly deleted upon restart of the database, may be handled in a safe manner despite being shared between multiple tenants in the database. By storing the random encryption key in transient memory, the random encryption key no longer exists after restart. As such, the random encryption key is only accessible during database operation. Further, because a new database instance has been created on restart, processing may proceed to back to step 402 thereupon, and a new random encryption key may be generated for newly created intermediate data.

Figure 5:
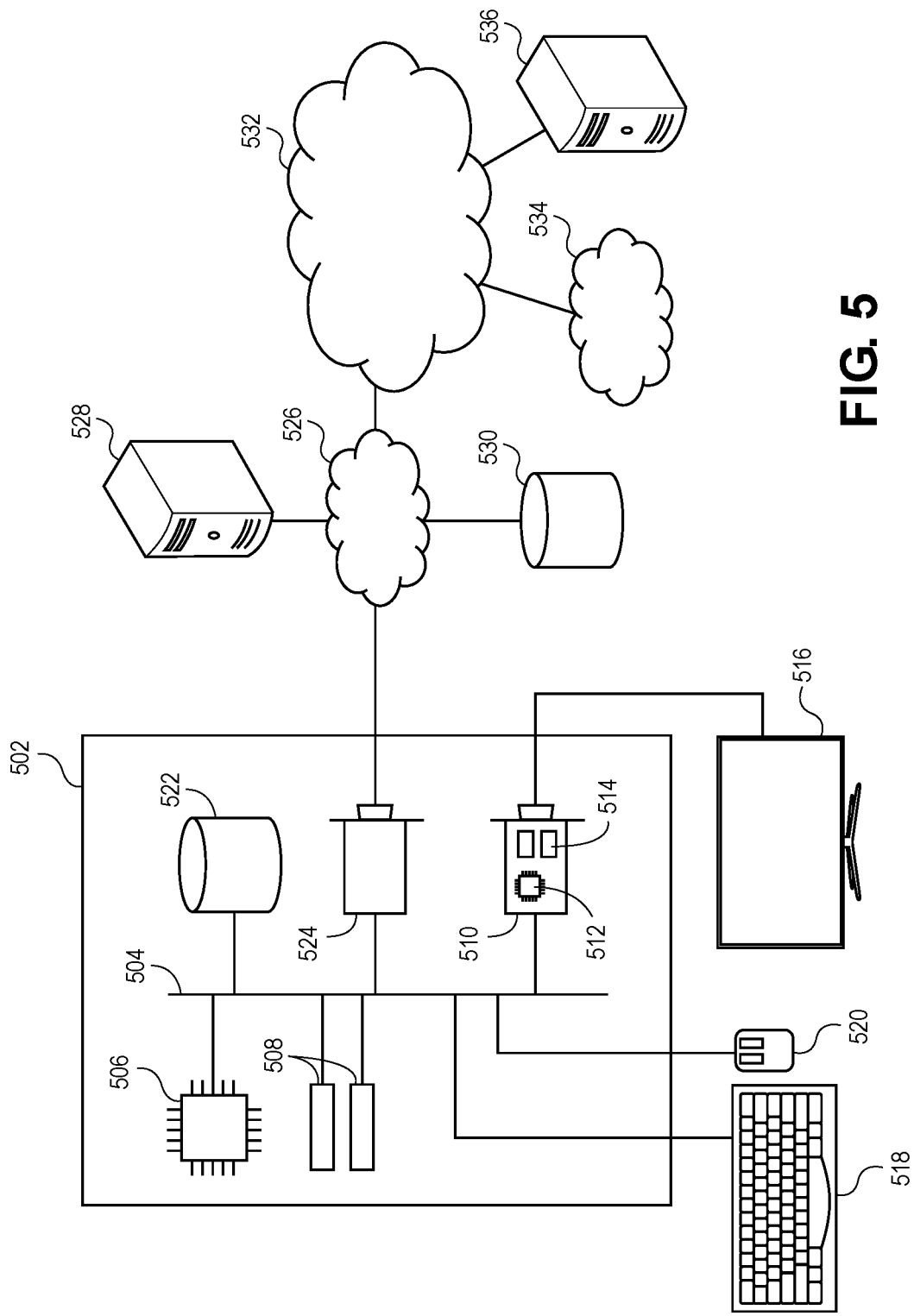
FIG. 5 is a diagram illustrating a sample computing device architecture for implementing various aspects described herein.

Turning now to FIG. 5, in which an exemplary hardware platform for certain embodiments is depicted. Computer 502 can be a desktop computer, a laptop computer, a server computer, a mobile device such as a smartphone or tablet, or any other form factor of general- or special-purpose computing device containing at least one processor. Depicted with computer 502 are several components, for illustrative purposes. In some embodiments, certain components may be arranged differently or absent. Additional components may also be present. Included in computer 502 is system bus 504, via which other components of computer 502 can communicate with each other. In certain embodiments, there may be multiple busses or components may communicate with each other directly. Connected to system bus 504 is central processing unit (CPU) 506. Also attached to system bus 504 are one or more random-access memory (RAM) modules 508. Also attached to system bus 504 is graphics card 510. In some embodiments, graphics card 510 may not be a physically separate card, but rather may be integrated into the motherboard or the CPU 506. In some embodiments, graphics card 510 has a separate graphics-processing unit (GPU) 512, which can be used for graphics processing or for general purpose computing (GPGPU). Also, on graphics card 510 is GPU memory 514. Connected (directly or indirectly) to graphics card 510 is display 516 for user interaction. In some embodiments no display is present, while in others it is integrated into computer 502. Similarly, peripherals such as keyboard 518 and mouse 520 are connected to system bus 504. Like display 516, these peripherals may be integrated into computer 502 or absent. Also connected to system bus 504 is local storage 522, which may be any form of computer-readable media, such as non-transitory computer readable media, and may be internally installed in computer 502 or externally and removably attached. Such non-transitory computer readable media may include transient memory such as RAM or other types of volatile computer readable media that do not persist stored information beyond a system shutdown or restart. It is understood that persistent storage (such as disk or solid state drive technology) is both non-transitory as well as non-transient, in that data stored in persistent storage persists data storage beyond a system restart.

Thus, non-transitory, computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 524 is also attached to system bus 504 and allows computer 502 to communicate over a network such as network 526. NIC 524 can be any form of network interface known in the art, such as Ethernet, ATM, fiber, Bluetooth, or Wi-Fi (i.e., the Institute of Electrical and Electronics Engineers (IEEE) 802.11 family of standards). NIC 524 connects computer 502 to local network 526, which may also include one or more other computers, such as computer 528, and network storage, such as data store 530. Generally, a data store such as data store 530 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 528, accessible on a local network such as local network 526, or remotely accessible over public Internet 532. Local network 526 is in turn connected to public Internet 532, which connects many networks such as local network 526, remote network 534 or directly attached computers such as computer 536. In some embodiments, computer 502 can itself be directly connected to public Internet 532.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random-access memory associated with one or more physical processor cores.

Many different arrangements of the various components depicted, as well as components not shown, are possible without departing from the scope of the claims below. Embodiments have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims. Although the present teachings have been described with reference to the embodiments illustrated in the attached drawing figures, it is noted that equivalents may be employed and substitutions made herein without departing from the scope of the present teachings as recited in the claims.

Having thus described various embodiments, what is claimed as new and desired to be protected by Letters Patent includes the following:

1. One or more non-transitory computer-readable media storing computer-executable instructions that, when executed by a processor, perform a method for handling intermediate data in connection with a database employing group-level encryption, the method comprising:
    upon startup of an instance of the database, generating a random encryption key;
    storing the random encryption key in transient memory;
    receiving a set of intermediate data, the set of intermediate data comprising data associated with a plurality of encryption groups associated with the database,
    wherein an encryption group of the plurality of encryption groups comprises a unique encryption key for encrypting data;
    performing an encryption operation on the set of intermediate data using the random encryption key;
    receiving a request to shut down the database; and
    responsive to receiving the request to shut down the database, wiping the transient memory.

2. The non-transitory computer-readable media of claim 1, wherein the intermediate data is stored in a data volume of the database.

3. The non-transitory computer-readable media of claim 2, wherein the data volume is stored transiently such that the data volume is deleted upon database restart.

4. The non-transitory computer-readable media of claim 1, wherein the method further comprises:
    responsive to a database restart, generating a new random encryption key.

5. The non-transitory computer-readable media of claim 1, wherein the random encryption key is generated according to the Advanced Encryption Standard.

6. The non-transitory computer-readable media of claim 1, wherein the intermediate data comprises data shared between a plurality of tenants associated with the database.

7. The non-transitory computer-readable media of claim 1, wherein the method further comprises rotating the random encryption key.

8. A method for method for handling intermediate data in connection with a database employing group-level encryption, the method comprising:
    upon startup of an instance of the database, generating a random encryption key;
    storing the random encryption key in transient memory;
    receiving a set of intermediate data, the set of intermediate data comprising data associated with a plurality of encryption groups associated with the database,
    wherein an encryption group of the plurality of encryption groups comprises a unique encryption key for encrypting data;
    performing an encryption operation on the set of intermediate data using the random encryption key;
    receiving a request to shut down the database; and
    responsive to receiving the request to shut down the database, wiping the transient memory.

9. The method of claim 8, wherein the intermediate data is stored in a data volume of the database.

10. The method of claim 9, wherein the data volume is stored transiently such that the data volume is deleted upon database restart.

11. The method of claim 8, wherein the method further comprises responsive to a database restart, generating a new random encryption key.

12. The method of claim 8, wherein the random encryption key is generated according to the Advanced Encryption Standard.

13. The method of claim 8, wherein the intermediate data comprises data shared between a plurality of tenants associated with the database.

14. The method of claim 8, wherein the method further comprises rotating the random encryption key.

15. A system for handling intermediate data in connection with a database employing group-level encryption, the system comprising:
    at least one processor;
    and at least one non-transitory memory storing computer executable instructions that when executed by the at least one processor cause the system to carry out actions comprising:
        upon startup of an instance of the database, generating a random encryption key;
        storing the random encryption key in transient memory;
        receiving a set of intermediate data, the set of intermediate data comprising data associated with a plurality of encryption groups associated with the database,
        wherein an encryption group of the plurality of encryption groups comprises a unique encryption key for encrypting data;
        performing an encryption operation on the set of intermediate data using the random encryption key;
        receiving a request to shut down the database; and
        responsive to receiving the request to shut down the database, wiping the transient memory.

16. The system of claim 15,
    wherein the intermediate data is stored in a data volume of the database, and
    wherein the data volume is stored transiently such that the data volume is deleted upon database restart.

17. The system of claim 15, wherein the actions further comprise responsive to a database restart, generating a new random encryption key.

18. The system of claim 15, wherein the random encryption key is generated according to the Advanced Encryption Standard.

19. The system of claim 15, wherein the intermediate data comprises data shared between a plurality of tenants associated with the database.

20. The system of claim 15, wherein the actions further comprise rotating the random encryption key.

* * * * *